(12) United States Patent
Gallagher et al.

(10) Patent No.: US 10,556,532 B2
(45) Date of Patent: Feb. 11, 2020

(54) SEATING SYSTEM HAVING SEAT WITH INDIVIDUALLY CONTROLLABLE THERMAL UNITS

(71) Applicant: Lear Corporation, Southfield, MI (US)

(72) Inventors: David Gallagher, Sterling Heights, MI (US); Francesco Migneco, Salene, MI (US); Vyachislav Ivanov, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 192 days.

(21) Appl. No.: 15/595,398

(22) Filed: May 15, 2017

(65) Prior Publication Data

US 2018/0325264 A1    Nov. 15, 2018

(51) Int. Cl.
*A47C 7/74*    (2006.01)
*B60N 2/90*    (2018.01)
*B60N 2/56*    (2006.01)

(52) U.S. Cl.
CPC ............... *B60N 2/914* (2018.02); *A47C 7/74* (2013.01); *B60N 2/5685* (2013.01)

(58) Field of Classification Search
USPC ........................................................ 219/480
See application file for complete search history.

(56) References Cited

U.S. PATENT DOCUMENTS

| | | | |
|---|---|---|---|
| 6,353,207 B1 * | 3/2002 | Burt | A47C 4/54 219/217 |
| 6,506,153 B1 | 1/2003 | Littek et al. | |
| 6,682,494 B1 | 1/2004 | Sleichter, III et al. | |
| 7,219,923 B2 | 5/2007 | Fujita et al. | |
| 7,731,279 B2 | 6/2010 | Asada et al. | |
| 7,808,395 B2 | 10/2010 | Raisanen et al. | |
| 8,706,204 B2 | 4/2014 | Seo et al. | |
| 8,710,784 B2 | 4/2014 | Meyer et al. | |
| 8,725,311 B1 | 5/2014 | Breed | |
| 8,971,839 B2 | 3/2015 | Hong | |
| 8,979,191 B2 * | 3/2015 | Friderich | B60N 2/5685 297/180.11 |
| 8,989,697 B2 | 3/2015 | Leung et al. | |
| 9,170,028 B1 * | 10/2015 | Beer | B01L 7/52 |
| 9,237,242 B2 | 1/2016 | Basir | |
| 9,272,689 B2 | 3/2016 | Fung et al. | |
| 9,277,385 B2 | 3/2016 | Iwamoto | |
| 2004/0119599 A1 | 6/2004 | Stevenson et al. | |

(Continued)

FOREIGN PATENT DOCUMENTS

| CN | 2855822 Y | 1/2007 |
|---|---|---|
| CN | 203186154 U | 9/2013 |

(Continued)

*Primary Examiner* — Joseph A Stoklosa
*Assistant Examiner* — Dustin P Clary
(74) *Attorney, Agent, or Firm* — Brooks Kushman P.C.

(57) ABSTRACT

A seating system includes a seat, individually selectable and controllable thermal units individually positioned at respective locations within the seat corresponding to anatomical locations of a person sitting in the seat, and a controller. The thermal units to generate heat when activated. The controller to individually activate a subset of the thermal units to deliver heat to the anatomical locations of the person sitting in the seat corresponding to the respective locations within the seat of the activated thermal units.

8 Claims, 4 Drawing Sheets

(56) References Cited

U.S. PATENT DOCUMENTS

| | | | |
|---|---|---|---|
| 2010/0130808 A1* | 5/2010 | Hattori | B60H 1/00742 600/9 |
| 2012/0285254 A1* | 11/2012 | Niimura | G01L 9/0042 73/754 |
| 2012/0292301 A1* | 11/2012 | Anzai | B60N 2/5685 219/217 |
| 2015/0266405 A1 | 9/2015 | Fitzpatrick et al. | |
| 2016/0052362 A1* | 2/2016 | Thomas | B60N 2/80 62/3.3 |
| 2016/0278709 A1 | 9/2016 | Ridao Granado et al. | |

FOREIGN PATENT DOCUMENTS

| | | | |
|---|---|---|---|
| WO | 2015127193 A1 | 8/2015 | |
| WO | 2016099299 A1 | 6/2016 | |

* cited by examiner

SEATING SYSTEM HAVING SEAT WITH INDIVIDUALLY CONTROLLABLE THERMAL UNITS

TECHNICAL FIELD

The present invention relates to seats configured to deliver heat to seat occupants.

BACKGROUND

Localized musculo-skeletal discomfort such as lower back pain is a common affliction in the general population and may have a life-time prevalence of 60% to 90%. Heat therapy may provide a significant therapeutic benefit and may be more effective than over-the-counter pain medications in the treatment of musculo-skeletal pain, with overall longer lasting effects.

Being positioned inside a confined environment such as within a vehicle, with a limited range of movement and increased pressure and force placed upon various areas, can worsen pre-existing discomfort and pain. A person has a limited range of movement while being in a vehicle. This "locked position" may induce muscle spasms and subsequent pain. At this point, a pain-spasm-pain cycle is triggered, making the situation even worse as the number of driven hours increases.

Reducing discomfort increases the person's overall health by relieving stress. In the case of the person being the driver of the vehicle, reducing discomfort also decreases driver distraction caused by the discomfort. Therefore, the driver can focus attention on safe vehicle operation.

SUMMARY

A seating system includes a seat, individually selectable and controllable thermal units individually positioned at respective locations within the seat corresponding to anatomical locations of a person sitting in the seat, and a controller. The thermal units to generate heat when activated. The controller to individually activate a subset of the thermal units to deliver heat to the anatomical locations of the person sitting in the seat corresponding to the respective locations within the seat of the activated thermal units.

Each thermal unit may be one of a resistive joule heater, a resistive Peltier heater, an infrared emitter, and an infrared generating fabric.

The seating system may further include a human-machine interface to receive from the person a selection of the thermal units to activate. The controller can individually activate the thermal units selected by the person.

The seating system may further include a biometric sensor to detect locations of discomfort of the person sitting in the seat. The controller can individually activate the thermal units in accordance with a suggested treatment plan based on the detected locations of discomfort of the person sitting in the seat. The biometric sensor may include at least one of a EMG-based device, a localized oxygen level detector, and a pressure detector.

The seating system may further include a fidget sensor to detect locations of fidgeting of the person sitting in the seat. The controller can individually activate the thermal units in accordance with a suggested treatment plan based on the detected locations of fidgeting of the person sitting in the seat. The fidget sensor may include at least one of a piezo-electric sensor, a radar sensor, a Doppler based sensor, a piezo-resistive sensor, a capacitive sensor, a pressure-based sensor, and a camera.

The thermal units may be integrated into sub-components of the seat, between trim components and foam components of the seat, or part of an independent structure separately removable from the seat.

The seating system may further include a switching assembly connected to the thermal units. The controller may control the switching assembly to individually activate the subset of the thermal units.

The seating system may further include air bladders disposed within the seat. At least some of the thermal units are respectively positioned in front of the A-side of at least some of the bladders. The controller may control inflating and deflating of the bladders having the activated thermal units positioned thereon in conjunction with activating the activated thermal units.

A seating system for a vehicle includes a vehicle seat, individually selectable and controllable thermal units individually positioned at respective locations within the vehicle seat corresponding to anatomical locations of a person sitting in the vehicle seat, and a controller. The thermal units to generate heat when activated having a temperature in correspondence with an amount of energy supplied to the thermal units. The controller to individually activate a subset of the thermal units and control the amount of energy supplied to the activated thermal units for the activated thermal units to deliver heat to the anatomical locations of the person sitting in the vehicle seat corresponding to the respective locations within the vehicle seat of the activated thermal units.

The seating system may further include a human-machine interface and the controller may be programmed with one or more treatment plans each having unique thermal unit activation and temperature settings. The human-machine interface can receive from the person a selection of one of the treatment plans. The controller can individually activate the thermal units and control the amount of energy supplied to the activated thermal units in accordance with the selected treatment plan.

The seating system may further include a biometric sensor to detect locations of discomfort of the person sitting in the vehicle seat. The controller can individually activate the thermal units and control the amount of energy supplied to the activated thermal units in accordance with a suggested treatment plan based on the detected locations of discomfort of the person sitting in the vehicle seat.

The seating system may further include a fidget sensor to detect locations of fidgeting of the person sitting in the vehicle seat. The controller can individually activate the thermal units and control the amount of energy supplied to the activated thermal units in accordance with a suggested treatment plan based on the detected locations of fidgeting of the person sitting in the vehicle seat.

The seating system may further include a power source for supplying energy for the thermal units and a switching assembly connected between the power source and the thermal units. The controller can control the power source and the switching assembly to individually activate the subset of the thermal units and control the amount of energy supplied to the activated thermal units.

The seating system may further include air bladders disposed within the vehicle seat. At least some of the thermal units are respectively positioned in front of the A-side of at least some of the bladders. The controller may control inflating and deflating of the bladders having the activated thermal units positioned thereon in conjunction with activating the activated thermal units and controlling the amount of energy supplied to the activated thermal units.

The seating system may further include a biometric sensor to detect locations of discomfort of the person sitting in the vehicle seat. The controller may individually activate the thermal units, control the amount of energy supplied to the activated thermal units, and control inflating and deflating of the bladders having the activated thermal units positioned thereon in accordance with a suggested treatment plan based on the detected locations of discomfort of the person sitting in the vehicle seat.

The seating system may further include a fidget sensor to detect locations of fidgeting of the person sitting in the vehicle seat. The controller may individually activate the thermal units, control the amount of energy supplied to the activated thermal units, and control inflating and deflating of the bladders having the activated thermal units positioned thereon in accordance with a suggested treatment plan based on the detected locations of fidgeting of the person sitting in the vehicle seat.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of components. Therefore, specific structural and functional details disclosed herein are not to be interpreted as limiting, but merely as a representative basis for teaching one skilled in the art to variously employ the present invention.

Figure 1:
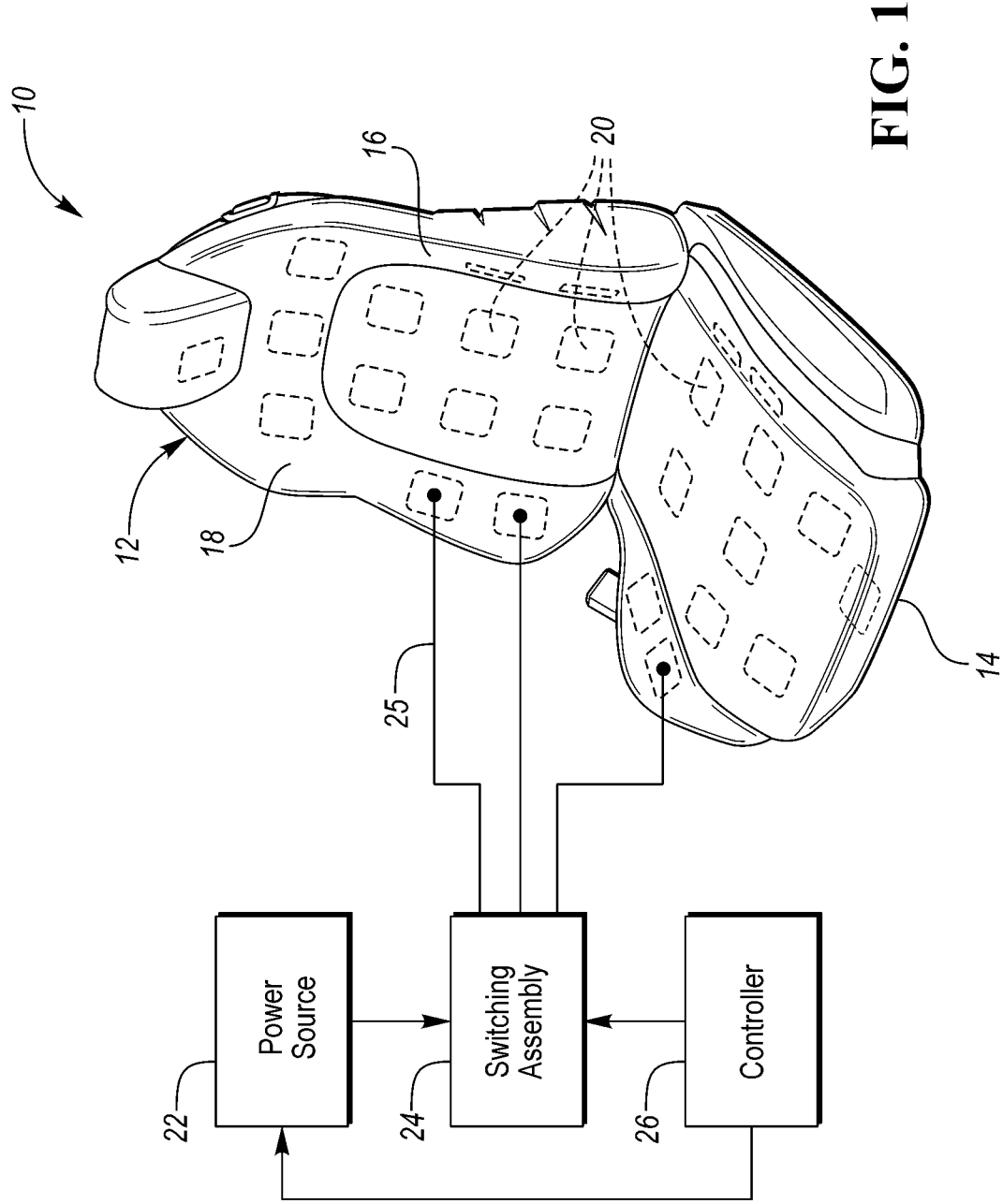
FIG. 1 illustrates a perspective view of a seat of a seating system and a block diagram of components of the seating system.

Referring now to FIG. 1, a perspective view of a seat 12 of a seating system 10 and a block diagram of components of the seating system is shown. Seating system 10 may be configured for use in vehicular and/or non-vehicular applications. Vehicular applications may include land vehicles such as cars, trucks, and trains, and non-land vehicles such as aircraft or marine vessels. Non-vehicular applications may include home or office furniture such as chairs or the like. Herein, seating system 10 will be described as for use in a vehicle and seat 12 will be understood as being a vehicle seat.

Seat 12 includes a seat bottom (i.e., a seat cushion) 14 and a seat back 16. Seat bottom 14 is configured to support the sitting region of a person sitting in seat 12. Seat back 16 is configured to support the back of the person sitting in seat 12. Seat back 16 is pivotably connected to seat bottom 14 to extend upright relative to the seat bottom. Seat 12 further includes a cover 18 which covers or upholsters seat bottom 14 and seat back 16.

Seating system 10 is designed to deliver localized heat from individually selectable areas of seat 12 to a person sitting in the seat. Seating system 10 in operation delivers heat targeted to affected anatomical areas of the person. An intended use of the targeted heat is for the treatment of the person's localized pain resulting from musculo-skeletal afflictions. As an example, the heat delivered from seat 12 to areas of the person in contact with the seat may have a temperature within a range of 40 to 45° C. Seating system 10 may be configured to deliver any other relatively high temperature heat providing therapeutic benefit to a person sitting in seat 12.

As shown in in phantom in FIG. 1, seat 12 includes an array of thermal units, thermal generation elements, heating units, etc. ("thermal units") 20. Thermal units 20 are configured to generate heat. For instance, any of thermal units 20 may be embodied as classical resistive joule heating elements, Peltier resistive devices, direct infrared emission units, infrared generating fabrics, and the like. Thermal units 20 are distributed across seat bottom 14 and seat back 16. Seat bottom 14 and seat back 16 are divided into any number of thermal units 20 based on the seat design.

More particularly, thermal units 20 are strategically arranged within seat 12 to correspond with general anatomical locations of major muscle groups of a person sitting in the seat. Thermal units 20 work independently of one another via a master controller such that they can function alone or in unison to provide localized thermal tissue stimulation. As such, thermal units 20 are individually selectable and controllable to generate heat. Thermal units 20 in different areas of seat 12 can be selected individually or in any combination to deliver heat to affected anatomical areas of concern of an occupant of the seat. In this way, each area of seat 12 can be selected individually or in any combination to match affected anatomical areas of concern of a person sitting in the seat.

Seating system 10 further includes a power source 22, a switching assembly 24, and a controller 26. Power source 22 provides power or energy for thermal units 20. Thermal units 20 convert energy supplied from power source 22 into heat. Switching assembly 24 is interposed between power source 22 and thermal units 20. For instance, as indicated in FIG. 1, switching assembly 24 on the one hand is connected to power source 22 and on the other hand is individually connected to thermal units 20 via electrical conductors 25. As such, thermal units 20 are individually connected to receive power from power source 22 via switching assembly 24.

Controller 26 controls switching assembly 24 to regulate power from power source 22 to thermal units 20. Controller 26 may also control power source 22 to control the power (amplitude, frequency, etc.) supplied from the power source to thermal units 20. In this way, thermal units 20 are each adjustable and can be individually or collectively powered to generate heat.

Figure 2:
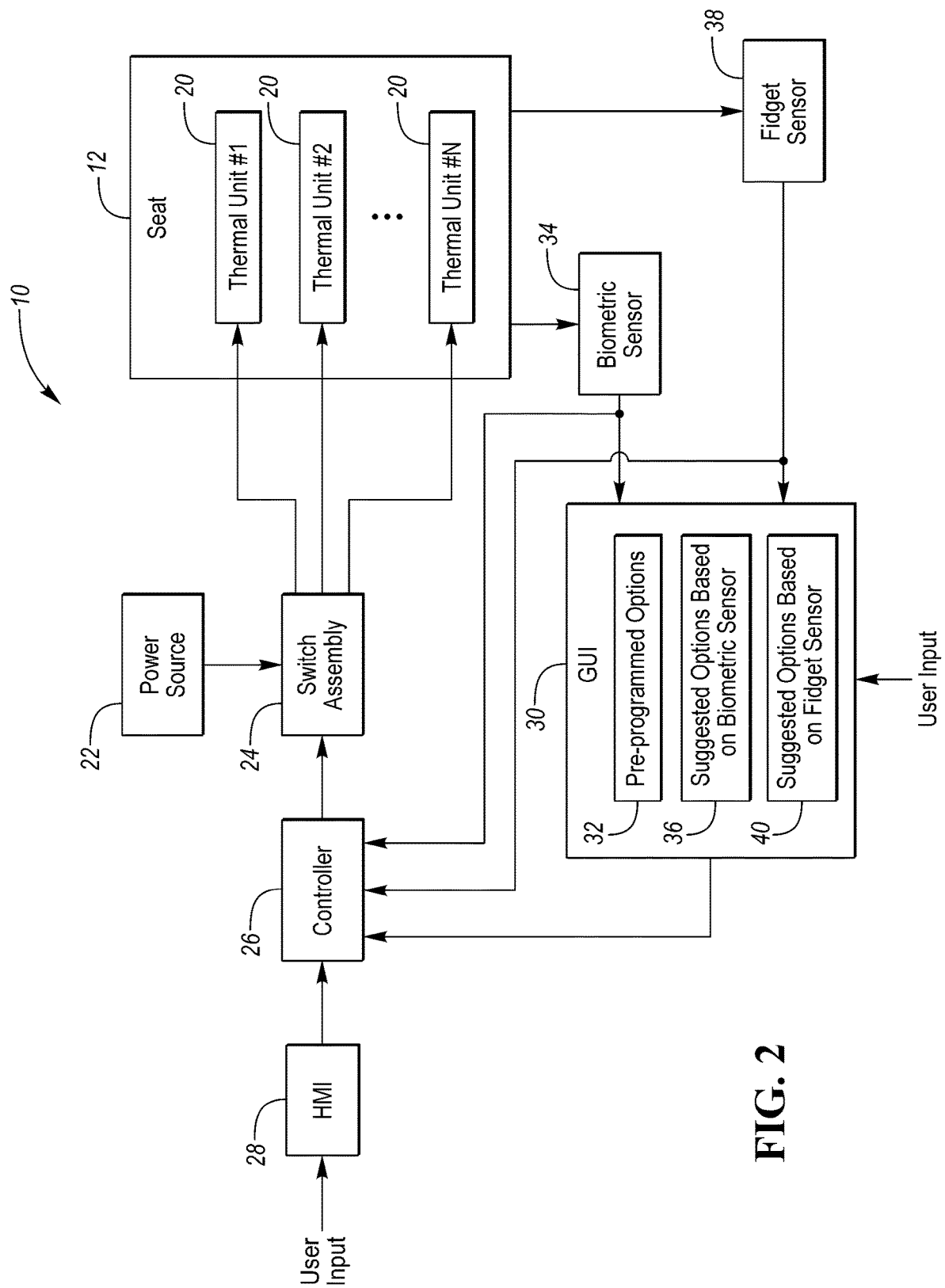
FIG. 2 illustrates a more detailed block diagram of the seating system.

Referring now to FIG. 2, with continual reference to FIG. 1, a more detailed block diagram of seating system 10 is shown. As described, thermal units 20 of seat 12 are controlled by controller 26 which regulates power source 22. The power distribution provided by controller 26 is manipulated via an input device or the like to activate various ones of thermal units 20.

Selection of thermal units 20 for activation (i.e., location(s) selection of seat 12 for heat activation) and temperature settings may be carried out in various ways in seating system 10. One way for activation selection of thermal units 20 and temperature settings involves a user providing manual input to controller 26. In this regard, seating system 10 further includes an input device in the form of a human-machine interface (HMI) device 28 in communication with controller 26. A user such as a person sitting in seat 12 accesses HMI device 28 to provide manual input to controller 26. For instance, HMI device 28 may include a touchscreen, knobs, buttons, microphone for voice commands, etc. The person accesses HMI device 28 to select which thermal units 20 are to be activated, the temperature settings of the thermal units which are to be activated, the duration of activation, and the like. Controller 26 in turn controls power source 22 and switching assembly 24 to cause heat to be delivered from thermal units 20 to the person sitting in seat 12 per the manual input.

In embodiments, seating system 10 may further include a machine learning unit to recognize dynamic user preferences over time. The machine learning unit may generate new user profiles fitting to each user based on the recognized user preferences. The machine learning unit can be further augmented with objective EEG response data to the effectiveness of each user profile.

Another way for activation selection of thermal units 20 and temperature settings involves pre-programmed treatment plans. Controller 26 may be pre-programmed with one or more treatment plans each having unique selection of thermal units 20 and temperature settings. In general, the pre-programmed treatment plans are suited for specific types of pain management. The pre-programmed treatment plans may be provided from a therapist or the like. The pre-programmed treatment plans are tailorable to different needs of persons who may sit in seat 12 and encompass, at a minimum, heat treatment of cervical, thoracic, lumbar, and sacral areas of the persons.

A user may select one of the pre-programmed treatment plans by accessing an input device in communication with controller 26. In this regard, seating system 10 further includes a graphical user interface (GUI) 30 in communication with controller 26. GUI 30 is configured to display pre-programmed options 32 for a user to view. Pre-programmed options 32 respectively correspond to the pre-programmed treatment plans. The user accesses GUI 30 to select one of the pre-programmed options 32. Controller 26 in turn controls power source 22 and switching assembly 24 to cause heat to be delivered from thermal units 20 to the person sitting in seat 12 per the pre-programmed treatment plan corresponding to the selected pre-programmed option 32.

Another way for activation selection of thermal units 20 and temperature settings involves (i) automatic suggestion by seating system 10 of the thermal units and temperature settings for consideration by the user to select and/or (ii) automatic selection by the seating system of the thermal units and temperature settings. In this regard, seating system 10 further includes one or more biomedical/biometrical systems (not shown) installed in seat 12 and/or in/around the vehicle. Sensor-based inputs from the biomedical/biometric systems to GUI 30 are used for the automatic suggestion of thermal units 20 and temperature settings. Likewise, the sensor-based inputs from the biomedical/biometric systems directly to controller 26 are used for the automatic selection of thermal units 20 and temperature settings.

Biometric sensor 34 shown in FIG. 2 represents the sensor(s) providing the sensor-based inputs from the biomedical/biometric systems of seating system 10. Biometric sensor 34 is configured to detect the level of discomfort and pain and the location of the affected area(s) of a person sitting in seat 12 and intuitively suggest one or more treatment plans. Biometric sensor 34 is in communication with GUI 30 to provide the suggested treatment plans to the GUI. GUI 30 in turn displays suggested treatment options 36 corresponding to the suggested treatment plans for the person to view. Upon the person selecting one of the suggested treatment options 36, controller 26 controls power source 22 and switching assembly 24 to cause heat to be delivered from thermal units 20 to the person sitting in seat 12 per the suggested treatment plan corresponding to the selected suggested treatment option 36.

Biometric sensor 34 is also in communication with controller 26 to provide a suggested treatment plan to the controller. When controller 26 is so configured, the controller automatically controls power source 22 and switching assembly 24 to cause heat to be delivered from thermal units 20 to the person sitting in seat 12 per the suggested treatment plan.

In embodiments, biometric sensor 34 is one or more of an electromyography (EMG) sensor, an oxygen sensor, a pressure sensor, and the like. In embodiments, the biomedical/biometrical systems of seating system 10 include an array of biometric sensors disposed in seat 12. The distribution of biometric sensors in seat 12 corresponds to the distribution of thermal units 20 or at least corresponds to major anatomical areas (thighs, buttocks, lumbar, thoracic cervical, etc.) of the person sitting in seat 12. When the person sitting in seat 12 experiences pain, the EMG pattern of the specific painful area changes from the normal baseline. Oxygen level as detected by the oxygen sensors in that area tends to decrease. A pressure on the anatomical area experiencing pain would be reduced with the application of heat from the neighboring thermal unit(s) 20.

Further in regards to automatic suggestion of thermal units 20 and temperature settings for consideration by the user and/or automatic selection of the thermal units and temperature settings, seating system 10 further includes a fidgeting sensor system (not shown) installed in seat 12 and/or in/around the vehicle. Sensor-based inputs from the fidgeting sensor system to GUI 30 are used for the automatic suggestion of thermal units 20 and temperature settings. Likewise, the sensor-based inputs from the fidgeting sensor system directly to controller 26 are used for the automatic selection suggestion of thermal units 20 and temperature settings.

Fidget sensor 38 shown in FIG. 2 represents the sensor(s) providing the sensor-based inputs from the fidgeting sensor system of seating system 10. Fidget sensor 38 is configured to detect the location of fidgeting of a person sitting in seat 12 and intuitively suggest one or more treatment options. The treatment options are to address the person's discomfort and/or pain which has manifested into the fidgeting. Fidget sensor 38 may be embodied as a piezo-electric sensor, a radar sensor, a Doppler based sensor, a piezo-resistive sensor, a capacitive sensor, a pressure-based sensor, a camera that visually detects fidgeting, and the like.

Fidget sensor 38 is in communication with GUI 30 to provide the suggested treatment plans to the GUI. GUI 30 in turn displays suggested treatment options 40 corresponding to the suggested treatment plans for the person to view. Upon the person selecting one of the suggested treatment options 40, controller 26 controls power source 22 and switching assembly 24 to cause heat to be delivered from thermal units 20 to the person sitting in seat 12 per the suggested treatment plan corresponding to the selected treatment option 40.

Fidget sensor 38 is also in communication with controller 26 to provide a suggested treatment plan to the controller.

When controller 26 is so configured, the controller automatically controls power source 22 and switching assembly 24 to cause heat to be delivered from thermal units 20 to the person sitting in seat 12 per the suggested treatment plan.

Fidget sensor 38 may be the best manner to detect discomfort of the person sitting in seat 12 with current technology available. In embodiments, for the fidget detection, along with the other sensor types (capacitive, Doppler, etc.), fidget sensor 38 is a piezo or pressure-based sensor. In embodiments, the fidgeting sensor system of seating system 10 includes an array or map of fidget sensors disposed in seat 12. The distribution of fidget sensors in seat 12 corresponds to the distribution of thermal units 20 or at least corresponds to major anatomical areas (thighs, buttocks, lumbar, thoracic cervical, etc.) of the person sitting in seat 12.

The person sitting in seat 12 in a state of comfort is relatively quiet. When pain/discomfort develops, the person starts exhibiting fidgeting. Fidgeting is a series of voluntary and involuntary movements that can have a specific repetitive pattern (typically, the area experiencing the most pain tends to move away to reduce the amount of pressure on to it). By looking at the presence of repetitive fidgets it can be determined whether the person is in a state of discomfort. It can be determined from analyzing the specific pattern what area of the person is most likely to hurt.

As described, seating system 10 through the various ways of selecting thermal units 20 for activation and temperature settings can create a custom profile for a person sitting in seat 12 who suffers from musculo-skeletal pain. The musculo-skeletal pain may be the result from a pre-existing condition and/or the result of a prolonged stay in the vehicle. In either case, thermal units 20 of seat 12 are controlled per the custom profile to provide therapeutic heat to the person sitting in the seat to alleviate or reduce the person's musculo-skeletal pain.

As described, thermal units 20, which are powered individually, can be individually selected manually by the person sitting in the seat or automatically based on the output of biometric sensor 34 and/or fidget sensor 38 which detect pain, discomfort, fidgeting, and the like. As an example of thermal units 20 being individually selectable, the selected thermal units 20 could include two thermal units 20 located in the lumbar area of seat back 16, one thermal unit 20 located in the left shoulder area of seat back 16, one thermal unit 20 located in the proximity of the neck area of seat back 16, etc.

As described, seat 12 has a fixed N-size array of thermal units 20 adjustable to any seat style and surface. Thermal units 20 may be integrated into sub-components (trim or foam) of seat 12 or free-form existing between the trim and the seat foam. Additionally, the array of thermal units 20 could be designed as an independent structure added to seat 12. As indicated in FIGS. 1 and 2, thermal units 20 interconnect via a main controller switch (i.e., controller 26 and switch assembly 24 in conjunction with one another) which regulates power and distribution. The switch is controlled by manual or automatic input.

As noted, thermal units 20 may be embodied via various types of thermal generation systems including: classical resistive joule heating elements; Peltier resistive devices; and direct infrared emission units. One or more of the various types of thermal generation systems are integrated in seat 12 as thermal units 20 in such a manner to provide localized distribution of multiple nodes of independent thermal capabilities. The selected thermal units 20 consume energy from power source 22. The selected thermal units 20 convert the consumed energy into thermal energy. The thermal energy is emitted from the selected thermal units 20 through the seating surface materials to be passed into the soft tissue of the person sitting in seat 12. Thermal units 20 are strategically distributed to allow for heat delivery targeting of major muscle groups over a variety of human types.

Thermal energy from thermal units 20 passing into the soft tissue of the person sitting in seat 12 results in vasodilation in the person. The vasodilation thereby allows for increased blood flow. This in turn facilitates tissue healing by supplying proteins, nutrients, and oxygen. It also provides increased connective tissue extensibility and muscle relaxation of the anatomical area targeted. It may also result in a central nervous stimulation (thalamic activity) that mitigates pain perception.

Figure 3:
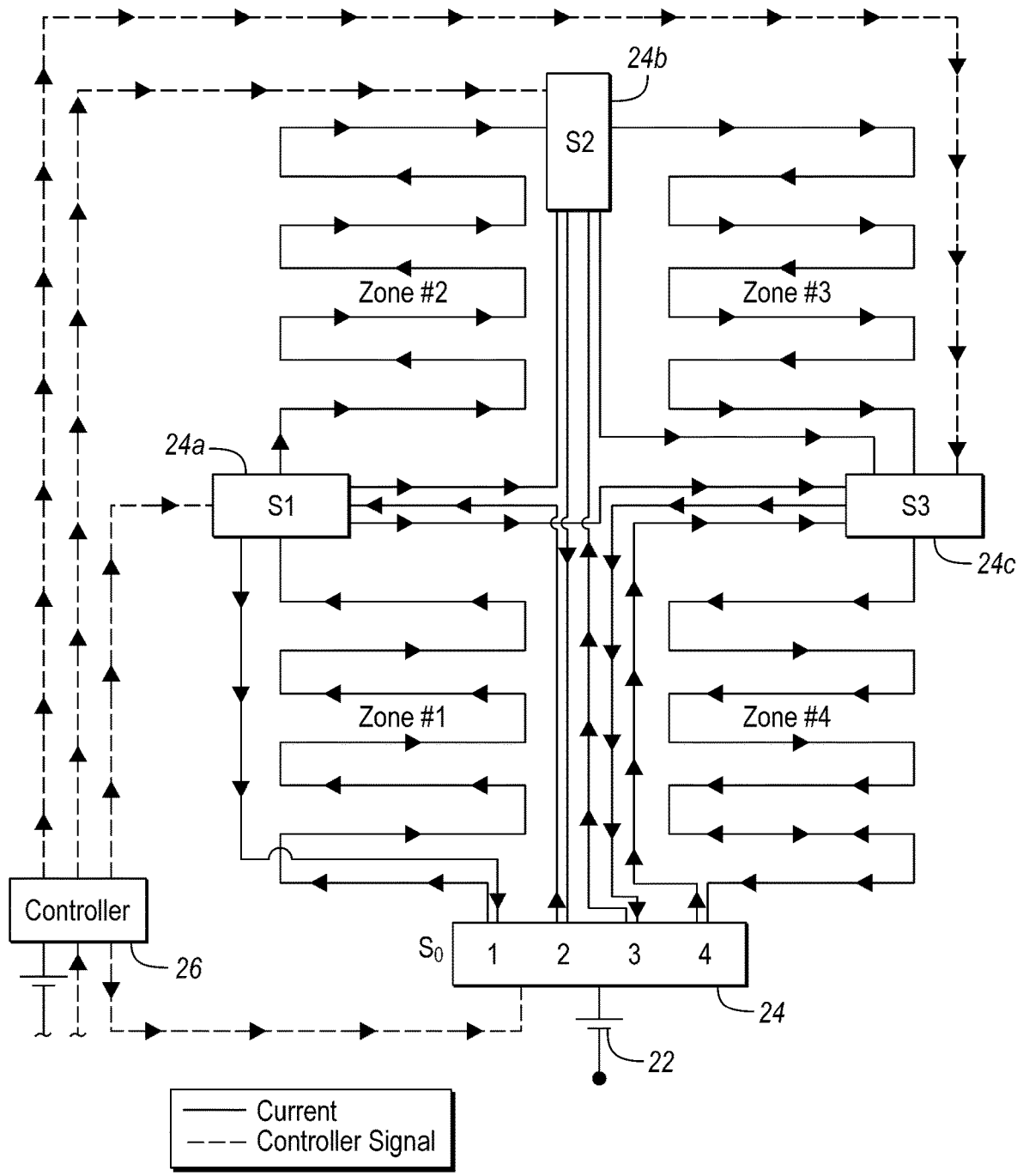
FIG. 3 illustrates a schematic of an exemplary version of the seating system.

Referring now to FIG. 3, with continual reference to FIGS. 1 and 2, a schematic of an exemplary version of seating system 10 is shown. This schematic outlines a configuration of a single series circuit Peltier system (i.e., thermal units 20 are embodied as Peltier devices). This configuration reduces electrical consumption via the use of a switching arrangement capable of directing the electrical current through or around particular zones of thermal units based on the zones selected. The zones of thermal units are labeled as Zone #1, Zone #2, Zone #3, and Zone #4 in FIG. 3. The switching arrangement include switching assembly 24 and individual switches 24a, 24b, and 24c. Thus, the configuration results in being a variable parallel circuit. Of course, exemplary version of seating system 10 shown in FIG. 3 is but one of many possible configurations involving thermal units 20.

Figure 4:
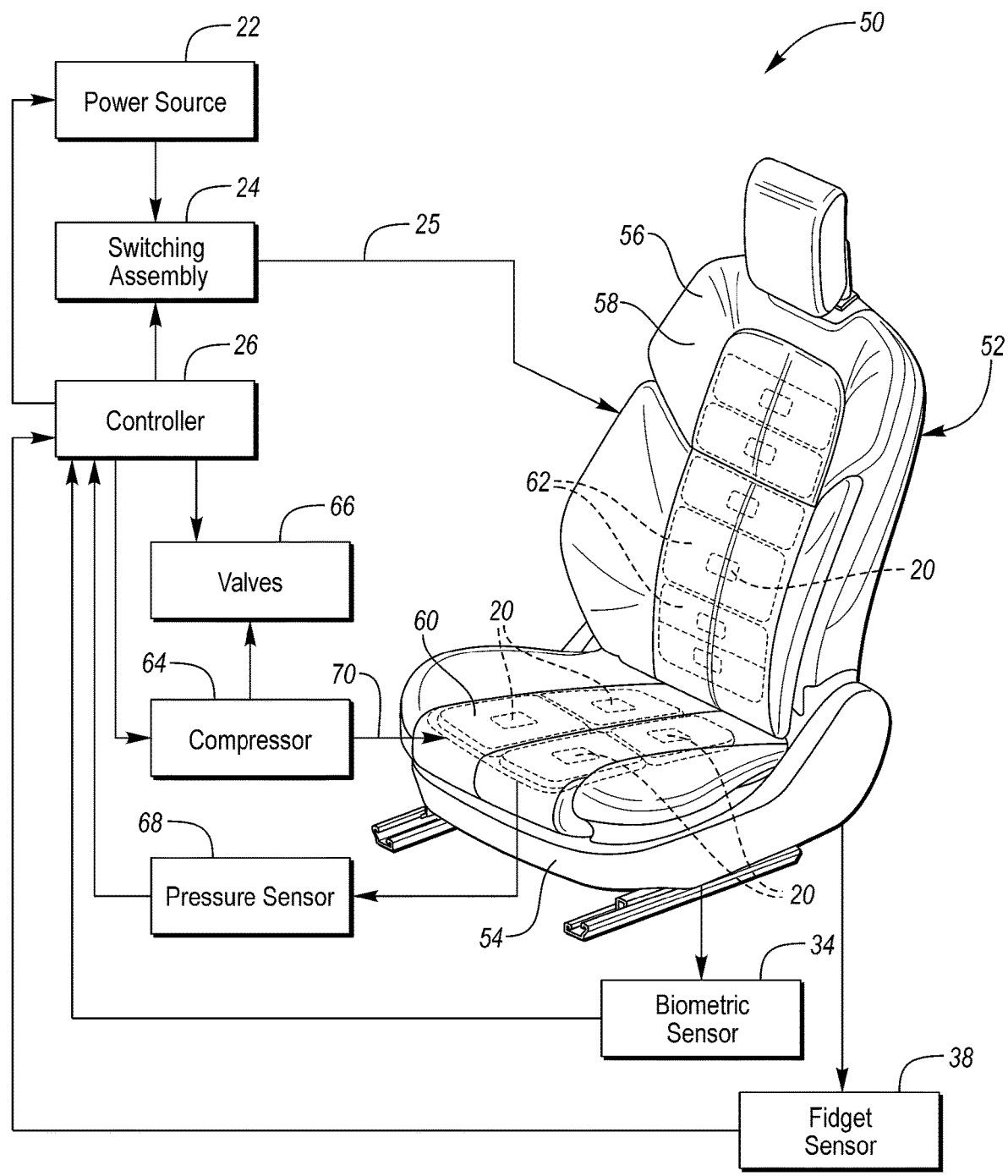
FIG. 4 illustrates a perspective view of another seat of another seating system and a block diagram of components of this seating system.

Referring now to FIG. 4, with continual reference to FIGS. 1 and 2, a perspective view of another seat 52 of another seating system 50 and a block diagram of components of this seating system is shown. Seat 52 includes a seat bottom 54 and a seat back 56 and a cover 58 which covers or upholsters the seat bottom and the seat back.

As shown in phantom in FIG. 4, seat 52 includes a set of air bladders 60 disposed in seat bottom 54 and a second set of air bladders 62 disposed in seat back 56. Bladders 60 and 62 are inflatable and deflatable. This is exemplary as seat bottom 54 and seat back 56 may have none or one or more bladders. Further, the illustration in FIG. 4 is exemplary as bladders may be disposed at any locations of seat bottom 54 and seat back 56.

Seat 52 further includes an array of thermal units 20. Thermal units 20 are respectively positioned in front of the "A-side" of bladders 60 and 62. Accordingly, as an air bladder inflates to apply pressure to an affected area of a person sitting in seat 52 or to assist with postural change, the associated thermal unit 20 is pushed forward against the person's body. This allows for better contact with thermal unit 20 and more effective heat transfer.

The components of seating system 50 include power source 22, switching assembly 24, and controller 26. As described, power source 22 provides energy for thermal units 20 and the thermal units convert the energy into heat. Switching assembly 24 is interposed between power source 22 and thermal units 20 via electrical conductors 25. Thermal units 20 receive power from power source 22 over electrical conductors 25. Controller 26 controls switching assembly 24 and power source 22 to individually regulate power from the power source to thermal units 20.

The components of seating system 50 further include a compressor 64, a plurality of valves 66, and a pressure sensor 68. Compressor 64 provides a source of air for inflating the bladders. Valves 66 receive the compressed air from compressor 64. Valves 66 are in fluid communication respectively with the bladders via respective air tubes (generally indicated by reference numeral 70). Each bladder is fluidly connected by a respective air tube 70 to receive the compressed air from compressor 64 via a respective valve 66. Air tubes 70 may be configured as flexible tubes, hoses, or the like. Controller 26 controls valves 66 to regulate the air into and out of the bladders. In this way, the bladders are each adjustable and can be individually or collectively inflated and deflated.

Pressure sensor 68 is configured to detect the air pressure in one or more of the bladders. Any pressure sensor is contemplated, such as a pneumatic pressure sensor at the outlet valve of a bladder. Pressure can also be sensed by a contact pressure sensor disposed in front of or behind a bladder, including on the front or rear surface thereof. The contact pressure sensor may be a pressure-sensitive mat. Controller 26 uses the value of the air pressure detected by pressure sensor 68 controlling the bladders to inflate and deflate to targeted air pressures. In this way, controller 26 may control the inflating and deflating of the bladders in any of a plurality of predetermined or user-defined massage cycles to massage a person sitting in seat 52.

In embodiments, seat 52 may further include pneumatic pistons for stronger pressure points. Controller 26 is operable to individually control the pneumatic pistons in providing the pressure points. In this way, controller 26 may control the pneumatic pistons in any of the predetermined or user-defined massage cycles to massage a person sitting in seat 52.

Controller 26 is further in communication with biometric sensor 34 and fidget sensor 38. Controller 26 can inflate and deflate any of the bladders in response to either a biometric/biomedical input received from biometric sensor 34 or a fidgeting input received from fidget sensor 38 (i.e., through a fidgeting detection system, EMG-based device, localized oxygen level detection, pressure mapping device, or a combination thereof). In conjunction, controller 26 can control the heating of thermal units 20 positioned on the bladders being inflated and deflated. In this way, the affected areas of a person sitting in seat 52 are sensed by biometric sensor 34 and/or fidget sensor 38 and controller 26 in turn reacts by inflating the corresponding bladders and initiating heat delivery.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A seating system comprising:
    a seat;
    first, second, and third sets of serially-connected thermal units individually positioned at respective locations in first, second, and third zones, respectively, within the seat corresponding to anatomical locations of a person sitting in the seat, the thermal units to generate heat when activated;
    a switching assembly connected to a power supply, the switching assembly having first, second, and third input ports and first and second output ports;
    a first switch having fourth and fifth input ports and third, fourth, and fifth output ports;
    a second switch having sixth and seventh input ports and sixth and seventh output ports;
    wherein the first set of thermal units is connected between the switching assembly and the first switch by being connected between the first output port and the fourth input port, the second set of thermal units is connected between the first switch and the second switch by being connected between the fourth output port and the seventh input port, and the third set of thermal units is connected between the second switch and the switching assembly by being connected between the seventh output port and the third input port;
    wherein the switching assembly and the first switch are directly connected via the first input port and the third output port, the switching assembly and the second switch are directly connected via the second input port and the sixth output port, and the first switch and the second switch are directly connected via the fifth output port and the sixth input port;
    a plurality of individually selectable and controllable air bladders individually positioned at respective locations within the seat corresponding to at least some of the anatomical locations of the person sitting in the seat, the air bladders to inflate and deflate when activated;
    wherein at least some of the thermal units are respectively positioned in front of an A-side of at least some of the air bladders;
    a plurality of fidget sensors individually positioned at respective locations within the seat corresponding to at least some of the anatomical locations of the person sitting in the seat, the fidget sensors to detect locations of fidgeting of the person sitting in the seat, wherein the fidget sensors are piezo sensors;
    a controller to control the switching assembly, the first switch, and the second switch to deliver electrical current from the power supply through
    (I) the first output port across the first set of thermal units to the fourth input port to activate and control temperature settings of the first set of thermal units and therefrom through
        (A) the third output port to the first input port to the power supply, and/or
        (B) the fourth output port across the second set of thermal units to the seventh input port to activate and control temperature settings of the second set of thermal units and therefrom through
            (b1) the sixth output port to the second input port to the power supply, and/or
            (b2) the seventh output port across the third set of thermal units to the third input port to activate and control temperature settings of the third set of thermal units and return to the power supply, and/or
        (C) the fifth output port to the sixth input port and therefrom through
            (c1) the sixth output port to the second input port to the power supply and/or
            (c2) the seventh output port across the third set of thermal units to the third input port to activate and control temperature settings of the third set of thermal units and return to the power supply, and/or through
    (II) the second output port to the fifth input port and therefrom through (A) the fourth output port across the second set of thermal units to the seventh input port to activate and control temperature settings of the second set of thermal units and/or (B) the fifth output port to the sixth input port and therefrom either through (b1) the sixth output port to the second input port to the power supply and/or (b2) the seventh output port across the third set of thermal units to the third input port to activate and control temperature settings of the third set of thermal units and return to the power supply, for the activated thermal units to deliver heat to the anatomical locations of the person sitting in the seat corresponding to the respective locations within the seat of the activated thermal units, in accordance with a suggested heat treatment plan based on the detected locations of fidgeting of the person sitting in the seat;

the controller to individually activate and control inflating and deflating of the air bladders, for the activated air bladders to massage the anatomical locations of the person sitting in the seat corresponding to the respective locations within the seat of the activated air bladders, in accordance with a suggested massage treatment plan based on the detected locations of fidgeting of the person sitting in the seat; and the controller to control inflating and deflating of the air bladders having the activated thermal units positioned thereon in conjunction with activating the activated thermal units to move the activated thermal units towards and away from the person sitting in the seat in accordance with the suggested heat treatment plan.

2. The seating system of claim 1 wherein:

each thermal unit is one of a resistive joule heater, a resistive Peltier heater, an infrared emitter, and an infrared generating fabric.

3. The seating system of claim 1 further comprising:

a human-machine interface to receive from the person a selection of zones for activation of the thermal units; and the controller to activate the sets of thermal units corresponding to the zones selected by the person.

4. The seating system of claim 1 further comprising:

a biometric sensor to detect locations of discomfort of the person sitting in the seat; and the controller to activate the sets of thermal units in accordance with a suggested treatment plan based on the detected locations of discomfort of the person sitting in the seat.

5. The seating system of claim 4 wherein:

the biometric sensor includes at least one an EMG-based device, a localized oxygen level detector, and a pressure detector.

6. The seating system of claim 1 wherein:

the thermal units are integrated into sub-components of the seat.

7. The seating system of claim 1 wherein:

the thermal units are between trim components and foam components of the seat.

8. The seating system of claim 1 wherein:

the seat is a vehicle seat.

* * * * *